United States Patent

[11] 3,614,084

| [72] | Inventor | Richard L. Brown |
| | | 1812 Pelton Ave., Bellevue, Nebr. 68005 |
| [21] | Appl. No. | 841,021 |
| [22] | Filed | July 11, 1969 |
| [45] | Patented | Oct. 19, 1971 |

[54] RESILIENTLY COMPRESSIBLE SPRING MECHANISM
14 Claims, 7 Drawing Figs.

[52] U.S. Cl. .................................................. 267/153, 272/57 E
[51] Int. Cl. ...................................................A63b 25/08, F16f 1/44, F16f 3/08
[50] Field of Search ...................................... 267/63, 152, 153, 140, 141; 213/45; 272/57 E

[56] References Cited
UNITED STATES PATENTS
| 1,703,222 | 2/1929 | Brimm ......................... | 267/63 |
| 2,239,113 | 4/1941 | O'Connor ..................... | 267/63 |
| 2,724,588 | 11/1955 | Sheets ......................... | 267/63 |
| 2,893,571 | 7/1959 | Mulcahy....................... | 213/45 |

FOREIGN PATENTS
| 186,923 | 11/1955 | Germany ...................... | 267/63 |

*Primary Examiner*—James B. Marbert
*Attorney*—George R. Nimmer

ABSTRACT: A resiliently compressible spring mechanism utilizing a plurality of separate resiliently compressible compressive units slidably associated and longitudinally consecutively disposed within an elongate hollow housing having a pair of endwalls adapted to longitudinally resiliently compressibly deform and translate the intervening compressive units when one endwall is moved under load conditions toward the other end wall. Each compressive unit includes a collar portion longitudinally slidably associated with the housing and a lengthier resinous mass portion providing spacing between the collar portions of adjacent compressive units. Convergent resinous mass portions afford an exceedingly lively pogo or jumping stick amusement device.

PATENTED OCT 19 1971

RICHARD L. BROWN
INVENTOR.

BY George R Nimmer
ATTORNEY

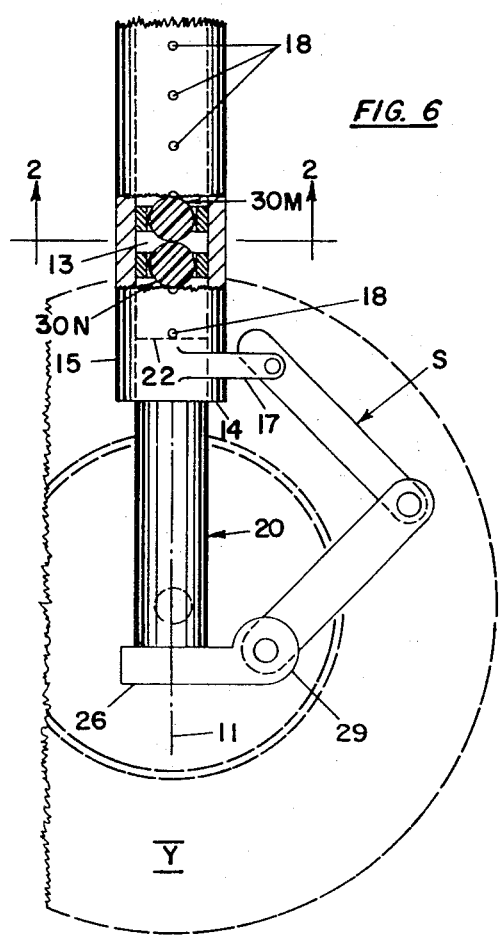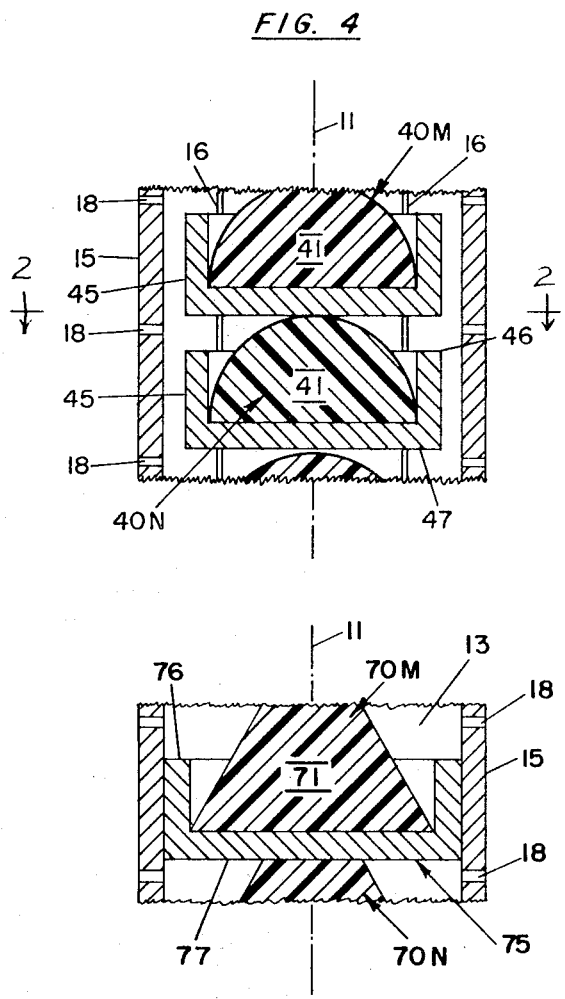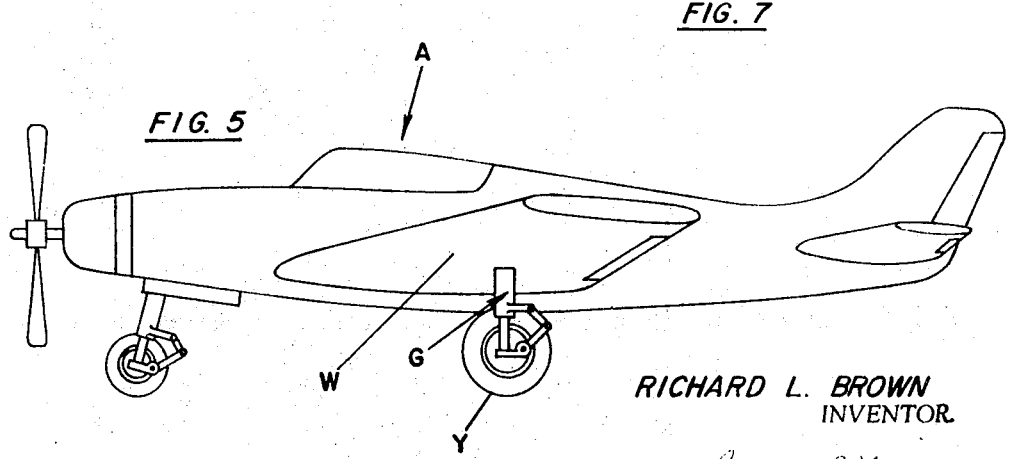
RICHARD L. BROWN
INVENTOR.
BY George R Nimmo
ATTORNEY

RESILIENTLY COMPRESSIBLE SPRING MECHANISM

Resiliently compressible spring mechanisms, such as helical metallic coil springs, are well known in the prior art and are embodied into a multitude of prior art mechanical apparatuses. Prior art resiliently compressible spring mechanisms are exceeding prone to fatigue and breakage. Moreover, prior art spring mechanisms' such as metallic helical coils, invariably exhibit the linear force to displacement characteristics as summarized by Hookes Law; that is, within the spring's elastic limit range, each unit of force causes a linear proportional change in the spring length. Thus, during operation of a linear force to displacement-type spring, excessive forces which would exceed the spring's elastic limit are often-times inadvertently applied, with the result that the spring itself is no longer operable. For example, the use of linear force to displacement-type resiliently compressible springs of the prior art with pogo or jumping stick amusement devices results in an apparatus that can be easily effectively destroyed through vigorous jumping, or by heavier weight operators; even under marginal operating conditions, such prior art pogo sticks do not have lively resiliency characteristics.

It is, accordingly, the general object of the present invention to provide a novel resiliently compressible spring mechanism that is long-lasting, fatigue-resistant, and that is readily easy and economical to make and maintain.

It is a further object of this invention to provide a novel resiliently compressible spring mechanism wherein the force to displacement ratio can be made to be either directly proportionately to the force applied, or "inversely exponential" wherein the spring resistance to compressive forces progressively increases with each incremental deformation.

It is another object to provide a novel resiliently compressible spring mechanism having a wide range of applications, especially in conveyance vehicles, wherein occupant comfort is to be achieved.

It is a further object to provide an unusually lively and exhilarating pogo or jumping stick amusement devise that is suitable for a wide weight range of possible operators.

With the above and other objects and advantages in view which will become more apparent as this description proceeds, the novel resiliently compressible spring mechanism comprises a plurality of separate resiliently compressible compressive units slidably associated and longitudinally consecutively disposed within a hollow housing having a pair of relatively movable end walls adapted to resiliently compressibly deform the intervening compressive units; each compressive unit comprises a slidable annular collar portion which surrounds a longitudinally lengthier resinous-mass portion, said length differential also providing longitudinal spacing between the collars of adjacent compressive units.

In the drawing, wherein like characters refer to like parts in the several views, and in which:

FIG. 1 is a perspective elevational view of the resiliently compressible spring mechanism of the present invention, and shown herein as the spring mechanism component of a pogo or jumping stick amusement device; two axial portions of the spring mechanism external housing are shown broken away to illustrate two of the mechanism's internal compressive units in sectional elevational view, and to illustrate the solid forward end of the piston portion.

FIG. 2 is a sectional elevational view taken along lines 2—2 of FIGS. 1 and 6, and also along line 2—2 of the FIG. 4 alternate embodiment.

FIG. 4 is a detail sectional elevational view similar to FIG. 3 showing an alternate type internal compressive unit.

FIG. 5 is a perspective elevational view of an aerodynamic aircraft having landing gears for alighting onto a hard-surfaced runway, said landing gear representing another application for the resiliently compressible spring mechanism of the present invention.

FIG. 6 is a detail elevational view of an aircraft landing gear, as typified in FIG. 6, an axial portion of the spring mechanism housing being broken away as in FIG. 1.

FIG. 7 is a detail view similar to FIGS. 2 and 4 showing another type compressive unit.

Figure 1:
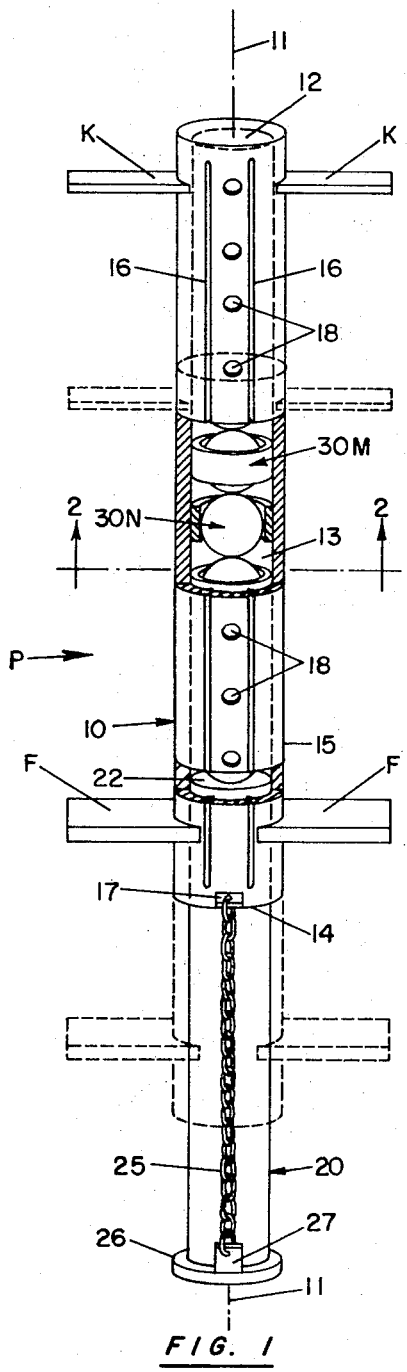
Figure 2:
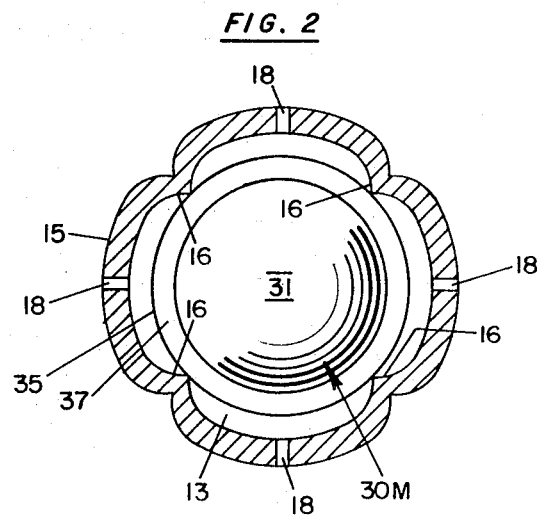
Figure 3:
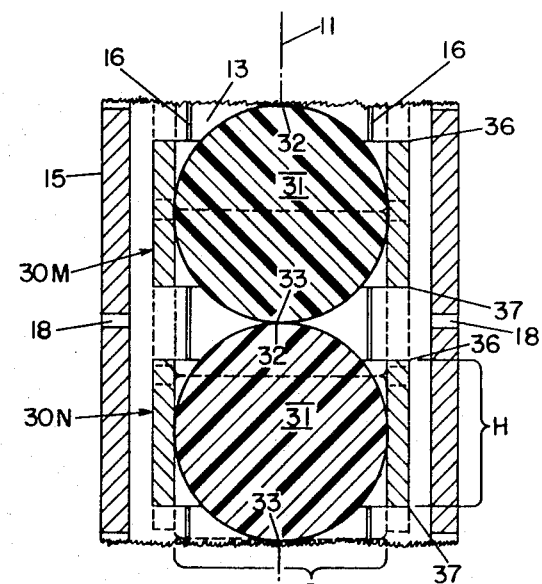
FIG. 3 is a detail sectional elevational view of FIG. 1 at the two internal compressive units, broken or phantom lines being used to show the resiliently compressed state of the compressive units.

The resiliently compressive spring mechanism of the present invention provides the basis for an exceedingly interesting pogo or jumping stick P of FIGS. 1–3 and for aircraft landing gear G of FIGS. 5 and 6.

As exemplified in FIG. 1, the novel resiliently compressible spring mechanism extends longitudinally along elongate upright central axis 11 between a pair of transverse solid end walls positioned at 12 and 22, respectively. At least one of the two transverse end walls, herein as the pistonlike rearward end wall 20 having planar forward end 22 is forwardly and rearwardly, (herein as upwardly and downwardly), reciprocatable along longitudinal axis 11 with respect to the other transverse forward end wall 12. Herein forward end wall 12 represents the closed upper end of a tubular cylindrical frame 10 with an axial bore 13 and with open lower or rearward end 14. A plurality of separate longitudinally resiliently compressible compressive units e.g. 30M, 30N, are disposed consecutively longitudinally along axis 11 within frame interior 13 between end wall positions 12 and 22, said independently positioned compressive units providing resiliently compressive resistance between the relatively movable transverse end walls e.g. cylinder wall 12 and piston 20.

Elongate tubular cylindrical frame 10 together with reciprocatable solid piston 20 provides an elongate hollow housing for the novel resiliently compressible spring mechanism and houses therewithin along axial elongate bore 13 the plurality of compressive units 30M, 30N, etc. Cylindrical frame portion 10 has a transversely closed forward or upward end 12, and as can be seen in FIG. 2, the elongate body portion 15 of frame 10 extending between cylinder ends 12 and 14 surrounds axis 11 in substantial parallelism thereto to define the lateral confines for housing axial bore 13. Desireably herein, frame elongate body portion 15 is made of a permanently radially bendable metal whereby the body portion 15 can be furnished with a plurality of (herein four) elongate internal spines 16, each spine being substantially parallel to longitudinal axis 11, whereby the radially extending spines 16 provide a low-friction longitudinal track-means or guide for reciprocatable piston 20 and also for the individual compressive units 30M, 30N, etc.

Each separate resiliently compressible compressive unit e.g. 30M, 30N, etc., includes a polymeric resinous-mass portion 31 disposed at axis 11 within frame bore 13 together with an annular collar portion 35; the annular collar portion of each compressive unit laterally surrounds resinous-mass portion 31, completely surrounds elongate frame axis 11, assists in maintaining the elevation of resinous-mass portion 31, and is slidably longitudinally associated along the internal lateral confines e.g. spines 16, of frame 10. As is especially clear in FIG. 3, the longitudingal height of the noncompressed resinous-mass 31 (as shown in solid line in FIG. 3) includes a terminus e.g. 32, longitudinally remote of the annular collar longitudinal terminus e.g. 36, the difference in the collar and resinous-mass longitudinal elevations providing a height-differential e.g. between elevations 32 and 36, which serves to establish a finite longitudinal spacing between the collars of consecutive noncompressed compressive units e.g. 30M, 30N. Morever, the amount of resinous structural material in the resinous-mass height-differential portion of the several noncompressed compressive units might progressively decrease from the collar terminus 36 to the remote resinous-mass terminus 32 whereby the spring mechanism has the desireable inverse exponential relationship between the amount of compressive longitudinal force applied to the movable piston end wall 20 and the actual longitudinal movement of said movable end wall toward the other end wall e.g. 12.

The preferred compressive unit, as illustrated with the identical units 30M and 30N in FIGS. 1 and 3 comprises a resinous-mass 31 and an annular collar 35, each being concentric about frame axis 11, and preferably, the resinous-mass 31 is substantially spherical while the annular collar 35 is in the form of a metallic circularly tubular ring having a pair of transverse ends 36 and 37, that are each substantially perpendicular to the housing and frame axis 11. The circular longitudinal bore of rigid annular collar 35 is concentric about axis 11 whereby collar 35 has a lateral internal diameter D; the lateral thickness of annular collar 35 is substantially constant whereby collar 35 has a lateral external diameter which exceeds internal diameter D and which is substantially equal to the effective lateral internal width of frame bore 13 e.g. between diametrically opposed spinelike guides 16. Spherical resinous-mass 31 is snugly surrounded by rigid annular collar 35 such that the polar or remote ends 32 and 33 of the spherical resinous-mass are disposed substantially equal longitudinal distances from collar termini 36 and 37 respectively, whereby the compressive unit e.g. 30N, 30M, has two substantially equal length height-differential convergent portions extending longitudinally between elevations 32–36 and 33–37, respectively. The snugly surrounding collar 35 causes a slightly longitudinal bulge in spherical resinous-mass 31 such that the longitudinal distance between remote ends 32 and 33 exceeds collar internal diameter D by a ratio within the range of substantially 1.01 to 1.10. Annular tubular collar 35 has a longitudingal height H between its respective ends 36 and 37, and thus, the internal volume of collar 35 can be mathematically expressed as ¼ ($D^2H$).

Further structural features of the novel resiliently compressible spring mechanism will be described in conjunction with the following operational description of said novel spring mechanism, as embodied for example, into the pogo or jumping stick amusement device P. A plurality of the separate resiliently compressible compressive units e.g. 30M, 30N, and totaling about seven such units, are stacked upon each other within elongate bore 13 between the piston solid forward end as a movable end wall 22 and the stationary forward end wall 12. The elongate external side of piston 20 is circularly concentric about axis 11 and extends from piston solid forward end 22 toward its rearward or lower end 26. The forward portion of piston 20 extends forwardly into the frame bore 13 commencing at frame open rearward end 14 whereby piston 20 is longitudinally slidably associated along the lateral internal confines of frame 10, herein along longitudinal spines 16. Integrally attached to cylindrical frame 10 and extending transversely outwardly thereof near its open lower end 14 is a pair of opposed barlike footrests F.

Integrally attached to cylindrical frame 10 and extending transversely outwardly thereof above footrests F and adjacent to the upper closed end 12 thereof, is a pair of opposed barlike handholds K. There are means to govern the permitted degree of travel of piston 20 away from frame rearward lower end 14 so as to prevent disengagement of piston 20 from cylindrical frame 10, and herein such means includes a flexible chain 25 removably attached between an integral lug 17 on frame 10 and a similar lug 27 on the integral lower-end baseplate 26 of piston 10.

When an operator mounts pogo stick P by emplanting his feet upon footrests F and by manually engaging handholds K, the operator's body weight causes frame 10 to move longitudinally downwardly, as indicated in phantom line in FIG. 1 relative to elements K, F, and 14; such longitudinal movement causes longitudinal resilient compression of each compressive unit 30M, 30N, etc., accompanied by slideable movement of the several annular collars 35, as indicated in phantom line in FIG. 3. While continuing to engage handholds K, the operator repeatedly flexes his legs downwardly against footrests F whereupon between each leg flexure, the pogo stick lower end 26 bounces progressively higher from the earth or other supporting substrate.

Every resiliently compressible polymeric resinous-mass inherently possesses an elastic limit of compressiblity i.e. the maximum degree of compressed deformation that the resinous-mass can withstand without losing its resiliency. In this regard, the resiliently compressible spring mechanism of the present invention has means to limit the degree of movement of each of the end walls e.g. piston 20, toward the other end wall e.g. frame forward end 12, to ensure against excessive longitudinal deformation of any one resinous-mass e.g. 31. Such limiting means might comprise a transversely extending pin (not shown) attached to piston 20 below frame rearward end 14. Preferably herein, as illustrated in phantom line in FIG. 3, such limiting means comprises the situation wherein the noncompressed volume of the spherical resinous-mass 31 substantially equals the internal volume of annular ring collar 35 whereby the collar portions of neighboring compressive units would contact each other before the resinous-mass is allowed to longitudinally deform to its compression elastic limit. In a related vein, the height-differential extension portion of the resinous-mass 31 should not be so dimensionally excessive that under a compressed state resinous-mass 31 would bulge laterally from the collar terminii and contact the lateral confine of elongate bore 13. For example, if the collar height would be drastically less than H there would be a drastically increased height-differential for plastic-mass 31 such that under compression the resinous-mass 31 might bulge laterally and inimicably bind against spines 16, preventing the desired slidability of collar 35. Moreover, it has been found that repeated lateral bulging of the resinous-mass against the abrupt terminii 36 and 37 of collar 35, even if not of sufficient degree to bind against the frame internal lateral confines, will cause undue inimical wear and fatigue upon resinous-mass 31.

Herein, a plurality of four longitudinal spines have been employed as the internal lateral confines of frame 10 to provide longitudinal sliding contact or guide means for the compressive unit collars 35. Not only are such thin spines 16 desirable from the standpoint of providing a low-friction sliding contact, but they do also provide a finite gap "breathing space" for the ancillary expelled air during longitudinal compression of the several compressive units 30M, 30N, etc. In lieu of longitudinal spines 16 and if circular collars 35 are slidably associated along circular internal lateral confines of frame elongate portion 15, the ambient air would provide a "breathing space" if elongate body 15 were provided with transverse perforations 18 spaced between adjacent noncompressed compressive units.

While several types of structural materials might be employed as the resinous-mass portion of the compressive units, such as polyisobutylene and similar resiliently compressible rubbery elastic substances, including extended and plasticized polymers, the resinous-mass e.g. 31, 41, 71, preferably comprises vulcanized polymers of basically polybutadine. For example, an exceedingly resiliently compressible resinous-mass portion results from the use of the resinous material described in U.S. Pat. No. 3,241,834, to wit: The combination of a vulcanized polymer characterized by the use of 100 parts by weight of polybutadine and 0.5 to 15 parts by weight of a sulfur vulcanizing agent, and further comprising, in addition to any activators and accelerators used for vulcanization, five to 15 parts by weight of an inorganic reinforcing material.

The pogo or jumping stick P heretofore described and resulting from the novel resiliently compressible spring mechanism herein (especially where the individual compressive units e.g. 30M, 30N, etc., comprise a spherical rubbery resinous-mass 31 that converges from the annular collar extremity toward longitudinal axis 11), represents an unusually lively amusement device adaptable for use by a wide range of operators. Moreover, the same pogo stick would exhibit similar bouncing effects upon the operator, whether he be a 50-pound child or an adult weighing upwards of 200 pounds. In the case of lighter weight operators, the resinous-mass convergent height-differential portion would compressibly deform a minor portion of the distance between resinous-mass terminus e.g. 32, and the collar terminus e.g. 36, whereas with heavier weight operators, the height-differential portion would compressibly deform a greater amount. Moreover, in the preferred situation wherein the resinous-mass height-differential portion converges from the annular collar extremity toward the longitudinal axis, and there is the inverse exponential relationship between longitudinally applied force and resultant compressible deformation, both heavier and lighter weight operators would experience the exhilaration of being upwardly accelerated very rapidly at the beginning of the return stroke, similar to the trampoline situation.

There are, of course, a multitude of mechanical apparatuses in the prior art which utilize helical springs or other resiliently compressible devices, and many such prior art apparatus are adaptable from the resiliently compressible spring mechanism of the present invention, as for example, automobile suspension springs and aircraft landing gear assemblies.

For example, as alluded to in FIGS. 5 and 6, the resiliently compressible spring mechanism embodiment from pogo stick P might be analogously employed within landing gear assembly G of aerodynamic aircraft A, landing gear assembly G herein having a rollable rubber tire lower terminus Y and being attached in conventional fashion to the underside of the aircraft's wing W. The means for governing the permitted degree of travel of piston 20 waay from frame lower end 14 comprises a scissors-type linkage S appropriate to the landing gear art, said linkage S being pivotably attached between lug 17 and to piston lug 29.

FIG. 4 illustrates an alternate type resiliently compressible compressive unit, herein as identical units 40M and 40N. Units 40M and 40N differ from units 30M and 30N in that a hemispherical resinous-mass 41 is employed rather than fully spherical as for 31. The annular collar 45 is cuplike and of circularly annular cross-sectional shape, and has a solid circular bottom plate 47. Resinous-mass 41 has a height-differential portion extending longitudinally remote of the collar longitudinal terminus 46. Unlike compressive units 30M and 30N, the 40M and 40N type units need not snugly surround the resinous-mass owing to the support afforded by bottom plate 47.

FIG. 7 illustrates another alternate type resiliently compressible compressive unit, herein as identical units 70M and 70N. The resinous-mass 71 of units 70M and 70N is frustro-pyramidal of rectangular cross-sectional shape. Annular collar 75 is cuplike and has a solid rectangular bottom plate 77, and the annular upright portion of collar 75 is substantially of rectangular cross-sectional shape. The housing internal lateral confines are of rectangular cross-sectional shape without longitudinal spines or ridges 16 thereby necessitating the use of transverse perforations 18 for air exhalation. The height-differential portion of resinous-mass 71, converges linearly from collar terminus 76 toward axis 11.

From the foregoing, the construction and operation of the resiliently compressible spring mechanism will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A resiliently compressible spring mechanism comprising:
   A. An elongate hollow housing disposed along an elongate central axis, said housing having a pair of opposed transverse end walls including a first end wall disposed some finite lengthy distance forwardly of a second end wall, at least one of said transverse end walls being forwardly and rearwardly reciprocatable with respect to the other transverse end wall, said elongate hollow housing also having an elongate body portion extending longitudinally between the opposed transverse end walls and surrounding the elongate central axis to define an elongate axial bore, portions of the internal elongate side of the elongate body portion being substantially parallel to the elongate central axis to define internal lateral confines for the elongate axial bore;
   B. A plurality of separate resiliently compressible compressive units disposed transversely of and consecutively along the housing elongate central axis within the housing central axial bore between the housing opposed transverse end walls, each separate compressive unit consisting of a single resiliently compressible self-sustaining structurally homogeneous resinous-mass that is laterally snugly surrounded by an annular tubular collar which is slidably disposed along the elongate internal lateral confines of the housing longitudinally extending body portion, the longitudinal height of the noncompressed resinous-mass including terminii longitudinally remote of the annular collar longitudinal terminii whereby there is height-differential for the noncompressed resionus-mass with respect to the collar, the said height-differential providing finite longitudinal spacing between the collar portions of consecutive compressive units; and
   C. Means to limit the degree of relative movement of one of the opposed transverse housing end walls toward the other transverse housing end wall.

2. The resiliently compressible spring mechanism of claim 1 wherein both the annular tubular collar and the resinous-mass components of each compressive unit are symmetrical about the housing elongate central axis; and wherein the amount of resinous structural material in the resinous-mass height-differential portion progressively decreases from a collar longitudinal terminus toward the elastic-mass longitudinal terminus whereby the spring mechanism has an inverse exponential relationship between the amount of compressive longitudinal force applied and the longitudinal movement of one transverse end wall toward the other end wall.

3. The resiliently compressible spring mechanism of claim 2 wherein the resinous-mass height-differential converges from the collar longitudinal terminus toward the elastic-mass longitudinal terminus.

4. The resiliently compressible spring mechanism of claim 3 wherein the annular collar of each compressive unit is provided of substantially rigid structural material whereby the collar remains substantially the same lateral dimensional size when one of the opposed transverse housing end walls moves against the intervening plurality of consecutive compressive units.

5. The resiliently compressible spring mechanism of claim 4 wherein each compressive unit comprises a tubular metallic collar symmetrically surrounding the housing elongate central axis, said tubular collar being longitudinally centrally open throughout including at both the forward and rearward terminii, and further comprises a substantially spherical resinous-mass snugly surrounded by the annular metallic collar, the longitudinal diameter of the spherical resinous-mass being positioned along the housing elongate central axis, the respective terminii of the spherical resinous-mass being disposed like distances longitudinally remote from the adjacent collar terminii whereby the resinous-mass has a pair of oppositely extending height-differential portions.

6. The resiliently compressible spring mechanism of claim 5 wherein the tubular annular collar is circular including a circular longitudinal interior wall concentric about the housing elongate central axis; and wherein when the spherical elastic-mass is removed from the annular collar, the ratio of the spherical elastic-mass longitudinal diameter to the interior diameter of the annular collar is within the range of about 1.01 to 1.10.

7. The resiliently compressible spring mechanism of claim 6 wherein the plastic-mass chemically comprises polybutadiene vulcanized-extended polymer.

8. The resiliently compressible spring mechanism of claim 7 wherein the housing elongate frame portion is provided with a plurality of transverse perforations therethrough into the housing central axial opening, the said transverse housing perforations being located between the collar portions of adjacent compressive units when the several compressive units are in the noncompressed state.

9. The resiliently compressible spring mechanism of claim 1 wherein the elastic-mass chemically comprises polybutadiene vulcanized-extended polymer.

10. The resiliently compressible spring mechanism of claim 1 wherein the elongate hollow housing comprises an elongate tubular cylindrical frame having a transversely closed forward end to provide the first forward end wall of the housing, said tubular cylinder having an elongate bore extending longitudinally forwardly of the cylinder open rearward end along the elongate central axis, said cylinder internal elongate lateral confines defining the housing elongate body portion, said elongate hollow housing further comprising an elongate piston having a rearward end and having a transverse forward end that provides the housing second transverse end wall, said piston forward portion extending forwardly into the cylinder along the elongate central axis commencing at the cylinder rearward open end and slidably engaged along internal elongate lateral confines of the cylinder whereby the piston including the transverse forward end thereof is vertically reciprocatable toward the closed forward end of the cylinder.

11. The resiliently compressible spring mechanism of claim 10 wherein each compressive unit comprises a circularly tubular collar that is substantially transversely rigid, said tubular collar symmetrically surrounding the cylinder elongate central axis, said tubular collar being longitudinally centrally open throughout including at both the forward and the rearward transverse terminii, said tubular rigid collar having an interior open volume extending between said forward and rearward terminii; and wherein the resinous-mass of each compressive unit upon the piston advancing toward the cylinder closed forward end is completely resiliently compressible into the interior open volume of the annular collar such that the entire resinous-mass including the height-differential portion of the originally noncompressed resinous-mass is disposed between the collar transverse terminii whereby said so temporarily compressed compressive units provide the means to limit the degree of relative movement between the respective housing end walls.

12. The resiliently compressible spring mechanism of claim 11 wherein the interior elongate lateral wall of the frame is symmetrical about the cylinder elongate central axis.

13. The resiliently compressible spring mechanism of claim 12 wherein the interior elongate lateral boundary of the frame comprises a plurality of relatively thin longitudinal spines disposed at several radial locations to provide a low-friction guide means for the several annular collars.

14. The resiliently compressible spring mechanism of claim 13 wherein the cylinder elongate frame portion is provided with a plurality of transverse perforations therethrough into the cylinder central axial bore, said transverse cylinder perforations being located between the collar portions of adjacent compressive units when the several compressive units are in the noncompressed state.